United States Patent [19]

Cockeram

[11] Patent Number: 4,720,974
[45] Date of Patent: Jan. 26, 1988

[54] SERVO-MECHANISM FOR USE IN A HYDROSTATIC TRANSMISSION

[75] Inventor: David A. Cockeram, Gloucester, England

[73] Assignee: Commercial Hydraulics Gloucester Ltd., Gloucester, England

[21] Appl. No.: 56,270

[22] Filed: May 26, 1987

Related U.S. Application Data

[63] Continuation of Ser. No. 890,886, Jul. 28, 1986, abandoned, which is a continuation of Ser. No. 682,315, Dec. 17, 1984, abandoned.

[30] Foreign Application Priority Data

Sep. 29, 1984 [GB] United Kingdom ............... 8424658

[51] Int. Cl.⁴ .............................................. F16D 31/02
[52] U.S. Cl. ........................................ 60/389; 60/443; 60/445; 417/218
[58] Field of Search ............... 60/443, 444, 445, 452, 60/389, 391, 392, 388; 91/368, 374, 506, 370, 372, 381; 417/218, 219, 220, 221, 222

[56] References Cited

U.S. PATENT DOCUMENTS

| | | | |
|---|---|---|---|
| 3,103,986 | 9/1963 | Barton et al. | 91/381 X |
| 3,127,745 | 4/1964 | Young | 60/389 |
| 3,168,203 | 2/1965 | Gallistel | 91/372 X |
| 4,013,380 | 3/1977 | Pensa | 417/218 |
| 4,461,147 | 7/1984 | Myers | 60/444 X |
| 4,476,680 | 10/1984 | Pollman et al. | 60/444 |

FOREIGN PATENT DOCUMENTS 101503  8/1979  Japan .................. 417/218

Primary Examiner—Edward K. Look
Attorney, Agent, or Firm—Stevens, Davis, Miller & Mosher

[57] ABSTRACT

A servo-mechanism includes a piston and cylinder unit controlled by a valve coupled in known manner by a linkage means to a movable control element to provide closed loop servo operation to position the piston and cylinder unit piston rod according to the position of the movable element. The movable element is fast with an annular gear segment of an epicyclic gear mechanism of which the sun gear forms a main control input and the planet pinion carrier forms an override input. The mechanism is of utility in an hydraulic transmission of the variable stroke pump/fixed stroke motor type, the overrride input being actuable by a pump port pressure limit sensor.

9 Claims, 4 Drawing Figures

SERVO-MECHANISM FOR USE IN A HYDROSTATIC TRANSMISSION

This application is a continuation of application Ser. No. 890,886 filed July 28, 1986, now abandoned which in turn is a continuation of application Ser. No. 682,315 filed Dec. 17, 1984 now abandoned.

This invention relates to a servo mechanism for use in an hydrostatic transmission.

A typical application of the invention is in the control of a continuously variable ratio hydraulic transmission of the type comprising a variable stroke pump connected to a fixed stroke hydraulic motor. In such an arrangement it is generally desirable to limit the torque transmitted so as to avoid damage to the transmission. Such limiting is usually effected by connecting pressure relief valves between the pipework or passages connecting the pump ports to the motor parts.

The use of relief valves in this way is acceptable if the pressure at which the valves open is well above normal working range, so that operation of the relief valve is rare and for brief intervals only. However, if the relief valve opening pressure is close to the upper limit of normal working pressures, the valve may open frequently and for relatively long intervals. In these circumstances overheating of the transmission liquid becomes a problem.

It has been appreciated by the applicants, that pressure limitation could be achieved by overriding the pump stroke control, which would prevent the overheating problem. However conventional overriding mechanisms considered were found to be too bulky for use in the type of application where overheating was likely and the object of the invention is thus to provide a simple, but compact servo mechanism whereby the desired overriding effect could be obtained.

A servo-mechanism in accordance with the invention comprises a first angularly movable member movable in accordance with a first mechanical input, a second angularly movable member movable in accordance with a second mechanical input co-axially with the first input member, a third angularly movable member movable coaxially with said first and second members, one of said first, second and third members forming a planet pinion carrier of an epicyclic gear train which also includes a sun gear fast with another of said three members, an annular gear segment fast with the remaining one of said three members and a planet pinion rotatably mounted on the planet pinion carrier and meshed with the sun gear and the annular gear segment, a power control device having an input element, linkage means connecting said third member to said input element, power operated means connected to said power control device for control thereby and having an output member movable under the influence of power supplied via said power control device and feedback means connecting said output member to said linkage means, whereby movement of said third member effects displacement of the input element via said linkage means, the resulting movement of the output member effecting cancellation of such displacement via said feedback means.

More specifically, the power control device may be a valve having a stem forming said input element, and the power operated means a piston and cylinder unit, the valve and the piston and cylinder unit being arranged with their axes in spaced parallel relationship, and the linkage means may then be a lever pivotally mounted on the said third member and a link connecting the valve stem to one end of the lever, the feedback means being a connection between the piston rod of the piston and cylinder unit and the other end of the lever.

The invention also resides in a servo-mechanism as defined above with the output element of the servo connected to the stroke control of an hydraulic pump forming a part of a variable ratio transmission, a means sensitive to the pressure at the pump output being connected to said second input member so as overridingly to control the stroke of the pump to limit the output pressure to a predetermined level.

The accompanying drawings show an example of the invention. In the drawings.

Figure 1:
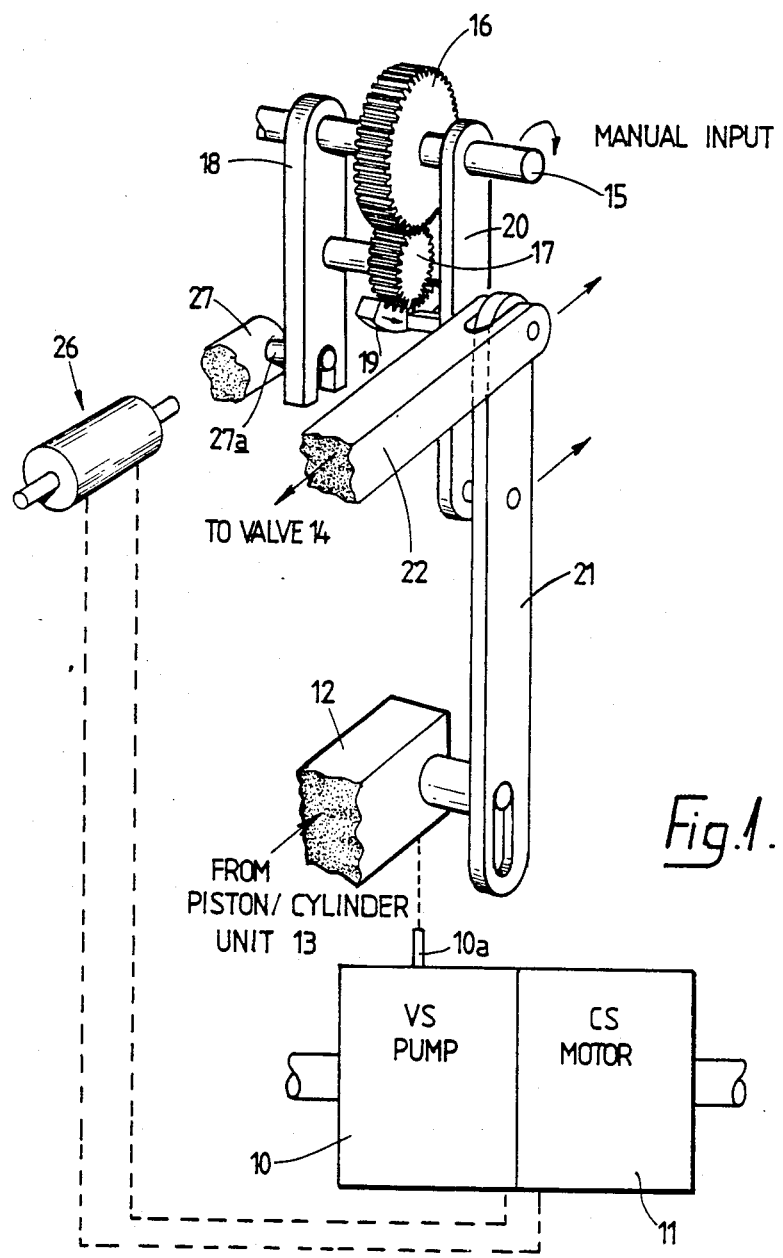
FIG. 1 is a schematic diagram of a continuously variable ratio hydrostatic transmission incorporating an example of a servo-mechanism in accordance with the invention.
Figure 2:
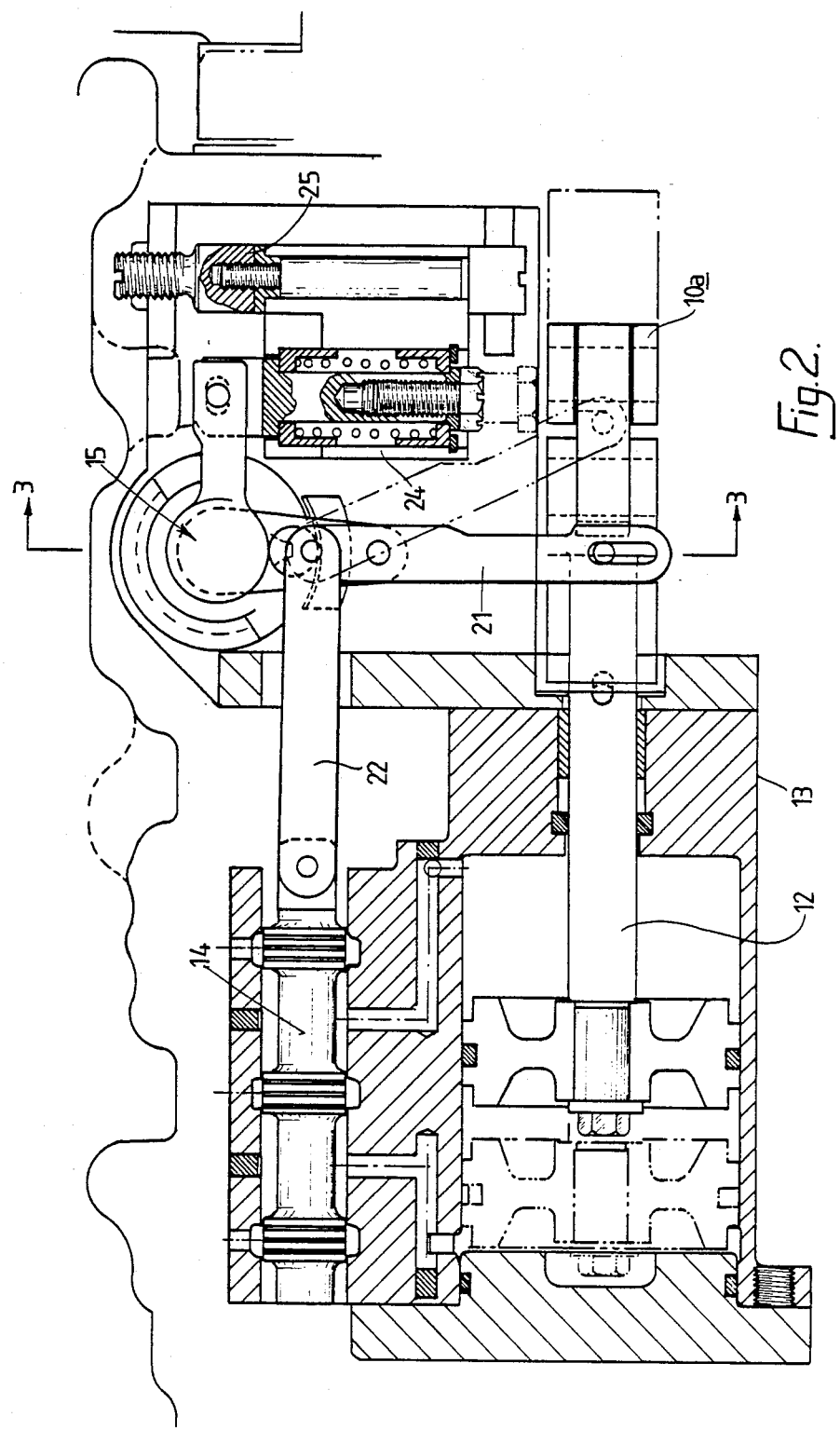
FIG. 2 is a fragmentary sectional view of the servo-mechanism.
Figure 3:
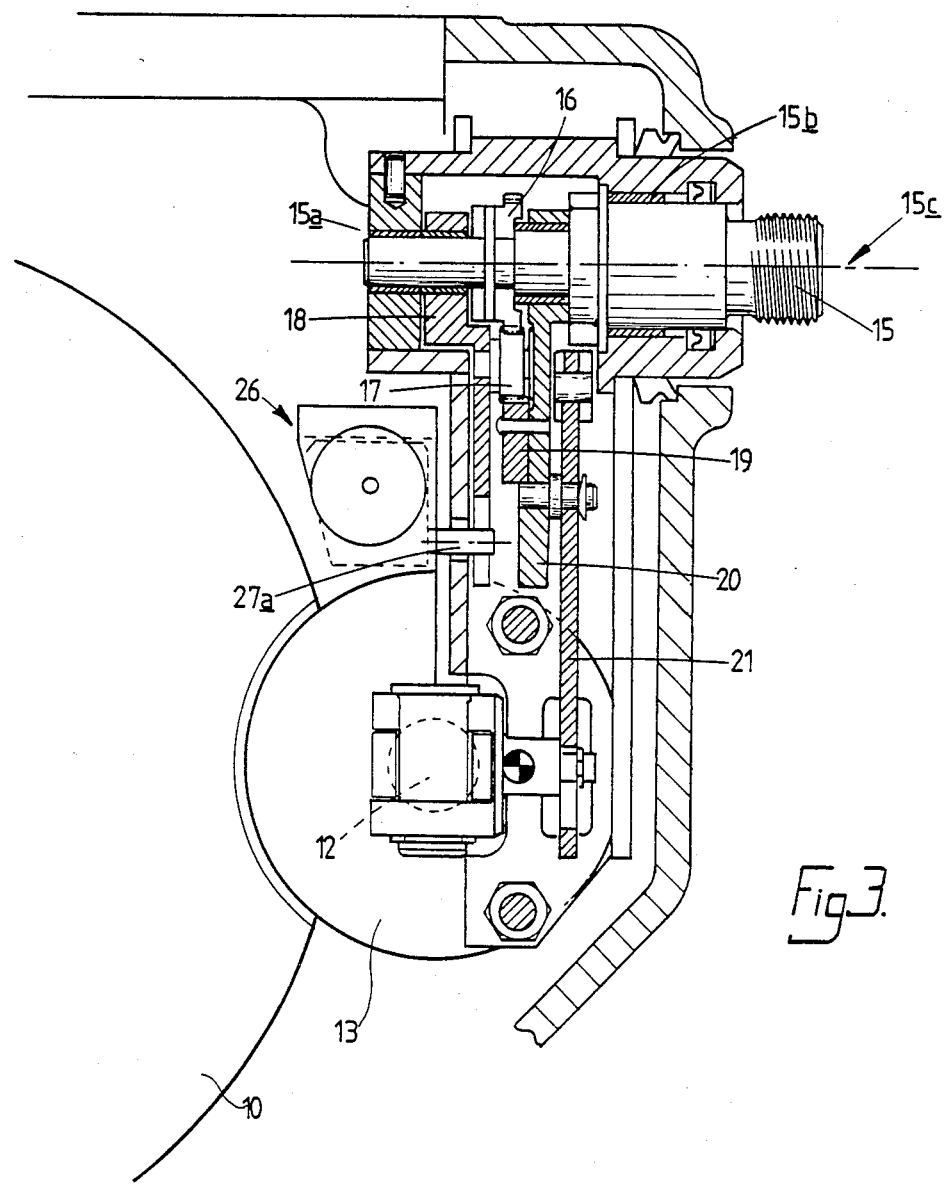
FIG. 3 is a section on line 3—3 in FIG. 2.

Referring, firstly to FIG. 1 the transmission shown includes a variable stroke swash plate type hydraulic pump 10 connected "back to back" with a fixed stroke hydraulic motor 11. Such transmissions, in which the ports of the pump and motor are directly interconnected by internal passages or pipes are very well known in the art. The stroke control 10a of the pump is mechanically linked to the piston rod 12 of an hydraulic piston and cylinder unit 13 (see FIGS. 2 and 4) controlled by a servo valve 14 (see FIG. 2).

The mechanical linkage which controls the valve 14 includes a manual input member 15 which is mounted on bearings, 15a, 15b to turn about a axis 15c perpendicular to the common plane of the axes of the piston and cylinder unit 12 and the valve 14.

A sun gear 16 is fastened to this manual input member 15 and meshes with a planet pinion 17 on a planet pinion carrier 18 mounted on the member 15 for angular movement relative thereto about the axis 15c. An annular gear segment 19 meshed with the planet pinion 17 is mounted on an arm 20 also mounted on member 15 for angular movement relative thereto about axis 15c. A lever 21 is pivotally mounted on the arm 20. One end of lever 21 is connected by a pivoted link 22 to the valve 14. The other end of lever 21 is connected by a pin and slot connection to the piston rod 12 of the piston and cylinder unit 13.

A spring unit 24 is provided for urging the input member 15 to a neutral position from which it can be displaced against the restoring force provided by the spring unit 24 in either direction. The spring unit 24 is of conventional construction. The spring unit 24 is mounted on the bodywork of the transmission through the intermediary of an adjustment device 25 by means of which the neutral position of the member 15 can be adjusted to match the neutral (zero tilt) position of the swash plate of the pump 10.

Figure 4:
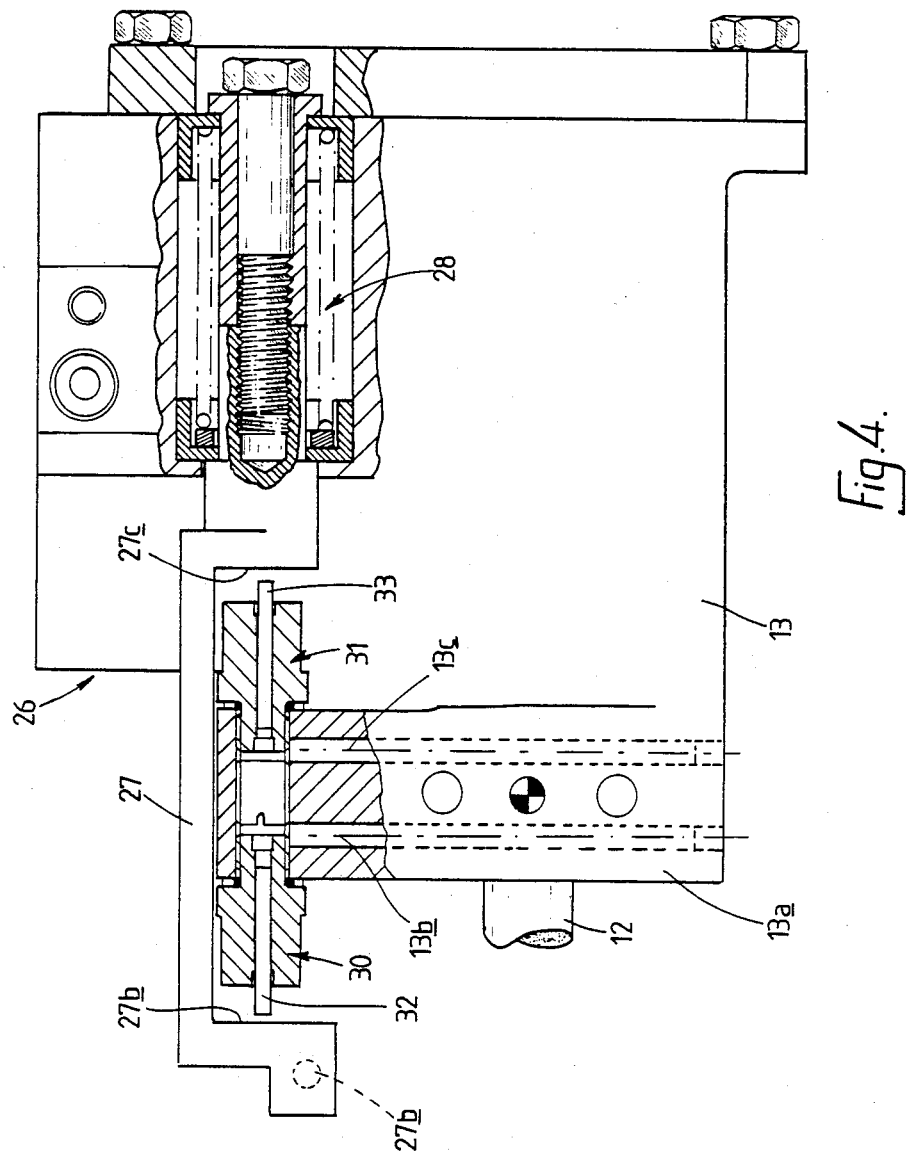
FIG. 4 is a part sectional view looking in the opposite direction to that of FIG. 2 and showing the relationship of a piston and cylinder unit forming part of the servo-mechanism and a pressure detecting override unit.

The planet pinion carrier 18 is coupled to a pressure limit detector unit 26 shown in more detail in FIG. 4. This unit 26 comprises an output element 27 mounted by means of a spring unit 28 similar in construction to the unit 24 on the piston and cylinder unit 13 and acting to hold the output element 27 in a neutral position from which it can be displaced in either direction against the restoring force of the spring unit 28. A peg 27a on the output element 27 is engaged in a slot in the planet pinion carrier 18 to provide the coupling referred to above.

Mounted on an end portion 13a of the piston and cylinder unit 13 are a pair of cylinder members 30, 31 in cylindrical bores in which two plungers 32, 33 are slidably mounted. The cylindrical bores are connected respectively to the two ports of the pump 10 via passages 13b, 13c in the end portion 13a, so that the pressure developed in each such port is applied to the respective plungers to urge them in opposite directions respectively. The output element 27 has two abutment faces engageable by the respective plungers 32, 33 to move the output element 27 in the appropriate direction. The pre-loading of the spring unit 28 is adjustable so that such movement of output element 27 commences at a predetermined pressure level.

Returning now to FIG. 1, the operation of the arrangement shown is as follows.

When the manual input member 15 is in its neutral position, the pump swash plate will be in neutral position also. Thus the preloading of spring unit 28 holds the output element 27 in its neutral position since the pump port pressure is very low. When the user starts displacing member 15 out of its neutral position in, say, the clockwise direction, the planet pinion 17 will act simply as an idler and cause arm 20 to turn in counter clockwise dierction. This causes the axis of the pivotal connection between arm 20 and lever 21 to be displaced to the right and since the lower end of lever 21 cannot displace the piston rod 12, the upper end of lever 21 also moves to the right, thereby displacing the servo-valve spool 14 and causing pressurised hydraulic fluid to enter the left hand end of the piston and cylinder unit to displace the piston rod 12 to the right. This causes lever 21 to turn in counter clockwise direction until the valve 14 closes in a new position. The mechanism operates correspondingly when the manual input is turned in counter clockwise direction, thereby providing conventional closed loop servo control of the pump stroke.

If, however, the pressure at whichever port of the pump is delivering pressurised fluid to the motor, rises above the predetermined level referred to the output element 27 will be displaced and the normal closed loop servo operation will be overridden. If, for example, the manual input member is being moved in the clockwise direction as described above, so that the bottom end of lever 21 is moving to the right, the output element 27 will move to the left when the pressure limit is reached, so that the valve 14 is closed to prevent further stroke increase or even reversed to reduce the pump stroke. Further turning of the manual input member 15 will be permitted, but will have no effect on the pump stroke which, in this mode of operation, is controlled by an overriding pressure regulating closed loop.

The use of an epicyclic gearing to introduce the overriding pressure control has been found to be extremely advantageous as compared with various multiple lever overriding arrangements which have been considered for them. Firstly, the epicyclic gearing is extremely compact as compared with a lever mechanism and therefore takes up little space in the transmission housing. Secondly, problems of maintaining a reasonably linear relationship between manual input member displacement and the resultant swash plate displacement are alleviated by the use of the epicyclic gearing. Finally, the stability of the mechanism under shock and vibrational loading conditions was found to be much improved by the reduction in the number of pin-joints required when substituting the gearing for additional lever.

With the arrangement described the epicyclic gearing also ensures that there is no interaction between the two input movements of the mechanism, i.e. operation of the pressure limiting arrangement does not cause any movement of the manual input member and vice versa.

I claim:

1. A servo-mechanism comprising a first angularly movable member movable in accordance with a first mechanical input, a second angularly movable member movable in accordance with a second mechanical input co-axially with the first movable member, a third angularly movable member movable coaxially with said first and second members, one of said three members forming a planet pinion carrier of an epicyclic gear train which also includes a sun gear fast with another of said three members, an annular gear segment fast with the remaining one of said three members and a planet pinion rotatably mounted on the planet pinion carrier and meshed with the sun gear and the annular gear segment, a power control device having an input element, linkage means connecting said remaining one of said three members to said input element, power operated means connected to said power control device for control thereby and having an output member movable under the influence of power supplied via said power control device and feedback means connecting said output member to said linkage means, whereby movement of said remaining one of said three members effects displacement of the input element via said linkage means, and said power operated means, responsive to a predetermined amount of displacement of said input element, causes said output member to cancel said displacement of said input element via said feedback means.

2. A servo-mechanism as claimed in claim 1 in which said first member is fast with the sun gear, said second member is fast with the planet pinion carrier and said third member is fast with the annular gear segment.

3. A servo-mechanism as claimed in claim 1 in which said power operated means is an hydraulic piston and cylinder unit having a piston rod forming said output member and the power control device is a valve having a stem forming said input element.

4. A servo-mechanism as claimed in claim 3 in which said valve and said piston and cylinder unit are arranged in spaced parallel relationship, said linkage means comprising a lever pivotally mounted on said third member and a link connecting one end of said lever to the valve stem, and said feedback means is a connection between the piston rod and the opposite end of said lever.

5. The combination of a servomechanism and a hydrostatic transmission mechanism, said servo-mechanism comprising a first angularly movable member movable in accordance with a first mechanical input, a second angularly movable member movable in accordance with a second mechanical input co-axially with the first movable member, a third angularly movable member movable coaxially with said first and second members, one of said three members, forming a planet pinion carrier of an epicyclic gear train which also includes a sun gear fast with another of said three members, an annular gear segment fast with the remaining one of said three members and a planet pinion rotatably mounted on the planet pinion carrier and meshed with the sun gear and the annular gear segment, a power control device having an input element, linkage means connecting said remaining one of said three members to said input element, power operated means connected to said power control device for control thereby and having an output member movable under the influence of power supplied via said power control device and feedback means connecting said output member to said linkage means, whereby movement of said remaining one of said three members effects displacement of the input element via said linkage means, and said power operated means, responsive to a predetermined amount of displacement of said input element, causes said output member to cancel said displacement of said input element, said power operated means comprising a hydraulic piston and cylinder unit having a piston rod forming said output member, the power control device comprising a valve having a stem forming said input element, said valve and said piston and cylinder unit being arranged in spaced parallel relationship, said linkage means comprising a lever pivotally mounted on said third member and a link connecting one end of said lever to the valve stem, said feedback means being a connection between the piston rod and the opposite end of said lever, the piston rod being connected to a transmission ratio control input of the transmission mechanism, the first member being connected to a manual transmission ratio control and said one of said three members being connected to an automatic override unit, said automatic override unit comprising means for moving said one of said three members in response to a transmission variable of said transmission mechanism exceeding a set level.

6. The combination claimed in claim 5 in which the transmission comprises a variable stroke pump having ports connected to ports of a fixed stroke motor, said transmission ratio control input being connected to vary the pump stroke and said automatic override unit being sensitive to the hydrostatic pressure in said ports.

7. The combination claimed in claim 6 further comprising a spring unit acting on said first member to urge the latter to a rest position from which it is displaceable in opposite directions against spring loading, and adjustment means mounting said spring unit for adjusting said rest position to coincide with a neutral position of the transmission ratio control input.

8. The combination claimed in claim 6 wherein said automatic override unit comprises a pair of plunger units associated respectively with the two ports of the pump and an output element spring loaded to a neutral position and coupled to said second member, the output element being displaceable by an appropriate one of said plunger units if a predetermined part pressure is exceeded.

9. An hydrostatic transmission mechanism comprising an hydrostatic variable stroke pump having a pair of ports; an hydrostatic motor having a pair of ports connected to the pump ports; a pump stroke control input member for varying the pump stroke; an hydraulic piston and cylinder unit having a piston rod connected to said pump stroke control input member; a valve controlling said piston and cylinder unit and having a stem; an epicyclic gear mechanism comprising a sun gear connected to a manual stroke control input member, a planet pinion carrier connected to a pump port pressure sensing unit, an annular gear segment, said sun gear planet pinion carrier and annular gear segment being mounted for coaxial angular movement relative to a housing, and a planet pinion rotatably mounted on the planet pinion carrier and meshed with both the sun gear and the annular gear segment; linkage means connecting the annular gear segment to the valve stem and feedback means connecting said piston rod to said linkage means, whereby, when the pump port pressure is below a predetermined limit the pump stroke is controlled by the manual stroke control input member, but the pump stroke is overridingly reduced by said pressure sensing unit to prevent excessive pressure developing.

* * * * *